United States Patent [19]

Eickemeyer et al.

[11] Patent Number: 5,459,844
[45] Date of Patent: Oct. 17, 1995

[54] PREDECODE INSTRUCTION COMPOUNDING

[75] Inventors: Richard J. Eickemeyer, Endicott; Stamatis Vassiliadis, Vestal; Bartholomew Blaner, Newark Valley, all of N.Y.

[73] Assignee: International Business Machines Corporation, Armonk, N.Y.

[21] Appl. No.: 287,435

[22] Filed: Aug. 8, 1994

Related U.S. Application Data

[62] Division of Ser. No. 543,464, Jun. 26, 1990, abandoned.

[51] Int. Cl.$^6$ ...................................................... G06F 9/40
[52] U.S. Cl. .................................. 395/375; 364/DIG. 1; 364/DIG. 2; 364/230; 364/230.3; 364/231.9; 364/262.4; 364/263
[58] Field of Search ...................... 364/DIG. 1 MS File, 364/DIG. 2 MS File; 395/200, 250, 275, 375, 400, 600, 425, 550, 658, 800, 700

[56] References Cited

U.S. PATENT DOCUMENTS

| | | | |
|---|---|---|---|
| 3,401,376 | 9/1968 | Barnes et al. | 364/DIG. 1 |
| 4,025,771 | 5/1977 | Lynch, Jr. et al. | 364/736 |
| 4,295,193 | 10/1981 | Pomerene | 364/DIG. 1 |
| 4,439,828 | 3/1984 | Martin | 364/DIG. 1 |
| 4,594,655 | 6/1986 | Hao et al. | 364/DIG. 1 |
| 4,847,755 | 7/1989 | Morrison et al. | 395/650 |
| 5,021,945 | 6/1991 | Morrison et al. | 395/375 |

OTHER PUBLICATIONS

Acosta, R. D., et al., "An Instruction Issuing Approach to Enhancing Performance in Multiple Functional Unit Processors", IEEE Transactions on Computers, Fall, C–35 No. 9, Sep. 1986, pp. 815–828.

Capozzi, A. J., et al., "Non–Sequential High–Performance Processing" IBM Technical Disclosure Bulletin, vol. 27, No. 5, Oct. 1984, pp. 2842–2844.

Chan, S. et al., "Building Parallelism into the Instruction Pipeline", High Performance Systems, Dec., 1989, pp. 53–60.

Anderson, V. W., et al., the IBM System/360 Model 91: "Machine Philosophy and Instruction Handling", computer structures: Principles and Examples (Siewiorek, et al.,) ed (McGraw–Hill, 1982,) pp. 276–292.

Murakami, K., et al., "SIMP (Single Instruction Stream/Multiple Instruction Pipelining): A Novel High–Speed Single Processor Architecture", Proceedings of the Sixteenth Annual Symposium on Computer Architecture, 1989, pp. 78–85.

Tomasulo, R. M. , "An Efficient Algorithm for Exploiting Multiple Arithmetic Units", Computer Structures, Principles and Examples (Siewiorek, et al. ed), McGraw–Hill, 1982, pp. 293–302.

Smith, J. E., "Dynamic Instructions Scheduling and the Astronautics ZS–1", IEEE Computer, Jul, 1989, pp. 21–35.

Smith, M. D. et al., "Limits on Multiple Instruction Issue", ASPLOS III, 1989, pp. 290–302.

Primary Examiner—Robert B. Harrell
Attorney, Agent, or Firm—Lynn L. Augspurger; Laurence J. Marhoefer

[57] ABSTRACT

A digital computer system capable of processing two or more computer instructions in parallel and having a main memory unit for storing information blocks including the computer instructions includes an instruction compounding unit for analyzing the instructions and adding to each instruction a tag field which indicates whether or not that instruction may be processed in parallel with another neighboring instruction. Tagged instructions are stored in the main memory. The computer system further includes a plurality of functional instruction processing units which operate in parallel with one another. The instructions supplied to the functional units are obtained from the memory by way of a cache storage unit. At instruction issue time, the tag fields of the instructions are examined and those tagged for parallel processing are sent to different ones of the functional units in accordance with the codings of their operation code fields.

11 Claims, 8 Drawing Sheets

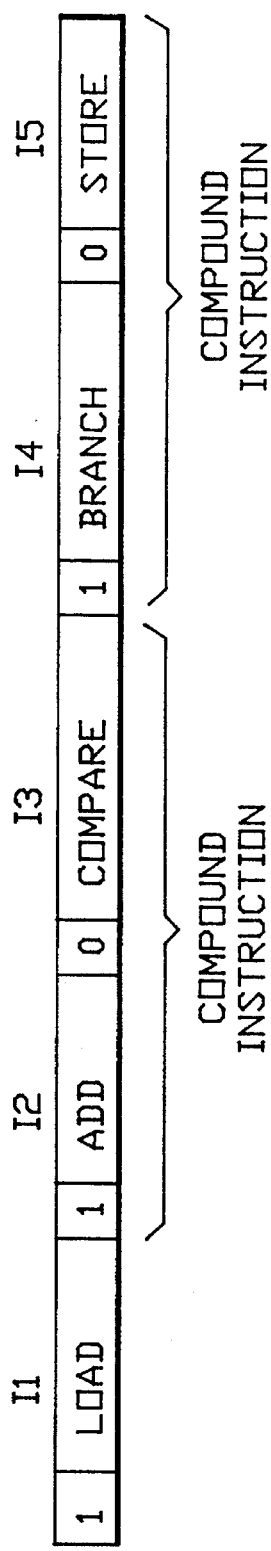

PREDECODE INSTRUCTION COMPOUNDING

This application claims priority and is a divisional of U.S. application Ser. No. 07/543,464, now abandoned, filed Jun. 26, 1990, now continued as U.S. application Ser. No. 08/098,240 filed on Jul. 29, 1993, now U.S. Pat. No. 5,355,460.

The present United States patent application claims priority of and is related to the following United States patent applications:

(1) Application Serial No.: U.S. Ser. No. 07/519,384, filed May 4, 1990, and now abandoned in favor of a continuation U.S. application Ser. No. 08/013,982 filed Feb. 5, 1993, now abandoned, entitled "Scalable Compound Instruction Set Machine Architecture", the inventors being Stamatis Vassiliadis et. al.;

(2) Application Serial No.: U.S. Ser. No. 07/519,382, filed May 4, 1990, and now abandoned in favor of a continuation U.S. Ser. No. 08/015,272 filed Feb. 5, 1993, now abandoned, entitled "General Purpose Compound Apparatus For Instruction-Level Parallel Processors", the inventors being Richard J. Eickemeyer et al;

(3) U.S. Pat. No. 5,051,940 granted Sep. 24, 1991, filed Apr. 4, 1990, entitled "Data Dependency Collapsing Hardware Apparatus", the inventors being Stamatis Vassiliadis et al; and (4) Application Serial No.: U.S. Ser. No. 07/522,291 now U.S. Pat. No. 5,214,763 granted May 25, 1993 and continued as U.S. Ser. No. 08/001,479 filed Jan. 7, 1993, now abandoned, entitled "Compounding Preprocessor For Cache", the inventors being Bartholomew Blaner et al.

These applications and the present application are owned by one and the same assignee, namely, International Business Machines Corporation of Armonk, New York.

The descriptions set forth in these applications are hereby incorporated into the present application by this reference thereto.

TECHNICAL FIELD

This invention relates to digital computers and digital data processors, and particularly to digital computers and data processors capable of executing two or more instructions in parallel.

BACKGROUND OF THE INVENTION

Traditional computers which receive a sequence of instructions and execute the sequence one instruction at a time are known. The instructions executed by these computers operate on single-valued objects, hence the name "scalar".

The operational speed of traditional scalar computers has been pushed to its limits by advances in circuit technology, computer mechanisms, and computer architecture. However, with each new generation of competing machines, new acceleration mechanisms must be discovered for traditional scalar machines.

A recent mechanism for accelerating the computational speed of uni-processors is found in reduced instruction set architecture that employs a limited set of very simple instructions. Another acceleration mechanism is complex instruction set architecture which is based upon a minimal set of complex multi-operand instructions. Application of either of these approaches to an existing scalar computer would require a fundamental alteration of the instruction set and architecture of the machine. Such a far-reaching transformation is fraught with expense, downtime, and an initial reduction in the machine's reliability and availability.

In an effort to apply to scalar machines some of the benefits realized with instruction set reduction, so-called "superscalar" computers have been developed. These machines are essentially scalar machines whose performance is increased by adapting them to execute more than one instruction at a time from an instruction stream including a sequence of single scalar instructions. These machines typically decide at instruction execution time whether two or more instructions in a sequence of scalar instructions may be executed in parallel. The decision is based upon the operation codes (OP codes) of the instructions and on data dependencies which may exist between instructions. An OP code signifies the computational hardware required for an instruction. In general, it is not possible to concurrently execute two or more instructions which utilize the same hardware (a hardware dependency) or the same operand (a data dependency). These hardware and data dependencies prevent the parallel execution of some instruction combinations. In these cases, the affected instructions are executed serially. This, of course, reduces the performance of a super scalar machine.

Superscalar computers suffer from disadvantages which it is desirable to minimize. A concrete amount of time is consumed in deciding at instruction execution time which instructions can be executed in parallel. This time cannot be readily masked by overlapping with other machine operations. This disadvantage becomes more pronounced as the complexity of the instruction set architecture increases. Also, the parallel execution decision must be repeated each time the same instructions are to be executed.

In extending the useful lifetime of existing scalar computers, every means of accelerating execution is vital. However, acceleration by means of reduced instruction set architecture, complex instruction set architecture, or superscalar techniques is potentially too costly or too disadvantageous to consider for an existing scalar machine. It would be preferred to accelerate the speed of execution of such a computer by parallel, or concurrent, execution of instructions in an existing instruction set without requiring change of the instruction set, change of machine architecture, or extension of the time required for instruction execution.

SUMMARY OF THE INVENTION

In U.S. patent application Ser. No. 07/519,384, now abandoned, a scalable compound instruction set machine (SCISM) architecture is proposed in which instruction level parallelism is achieved by statically analyzing a sequence of scalar instruction at a time prior to instruction execution to generate compound instructions formed by adjacent grouping of existing instructions in the sequence which are capable of parallel execution. Relevant control information in the form of tags is added to the instruction stream to indicate where a compound instruction starts, as well as to indicate the number of existing instructions which are incorporated into a compound instruction. Relatedly, when used herein, the term "compounding" refers to the grouping of instructions contained in a sequence of instructions, the grouping being for the purpose of concurrent or parallel execution of the grouped instructions. At minimum, compounding is satisfied by "pairing" of two instructions for simultaneous execution. Preferably, compounded instructions are unaltered from the forms they have when presented for scalar execution. As explained below, compounded instructions are accompanied by compounding tag information, that is, bits appended to the grouped instructions which denote the grouping of the instructions for parallel execution.

In a digital computer system which includes a means for executing a plurality of instructions in parallel, a particularly advantageous embodiment of the invention is based upon a memory architecture which provides for compounding of instruction prior to their issue and execution. Such a memory is a component of a hierarchical memory structure which provides instructions to the CPU (central processing unit) of a computer. Typically, such a structure includes a high-speed cache storage containing frequently accessed instructions, a lower speed main memory or primary storage connected to the cache, and a low-speed, high-capacity auxiliary storage. Typically, the cache and main storage contain instructions which can be directly referenced for execution. Access to instructions in the auxiliary storage is had through an input/output (I/O) adaptor connected between the main memory and the auxiliary storage.

In a scalar computer having a hierarchical storage organization, the invention resides in a combination including an input/output interface for providing, from secondary storage, a sequence of instructions for execution, an instruction compounding mechanism which produces compounding tag information in response to the instruction sequence, the compound tag information indicating instructions of the sequence which may be executed in parallel, and a main storage connected to the input/output interface and to the instruction compounding mechanism for storing the sequence of instructions with the compound tag information.

As is known, main memory provides residence for data and instructions which are immediately accessible to a CPU for reference for execution. The use of the main memory in a well-designed hierarchical storage system in and of itself serves to improve the overall performance of a scalar computer. In the invention, the storing of the compounding tag information in the main memory enables the information to be used over and over so long as the instructions remain in the main memory. Furthermore, instructions in main memory, once passed to a cache, frequently remain in a cache long enough to be used more than once.

For a better understanding of the invention, together with its advantages and features, reference is made to the following description and the below-described drawings.

BRIEF DESCRIPTION OF THE DRAWINGS

FIG. 11 shows an example of a particular sequence of instructions which may be processed by the computer system of FIG. 10; and FIG. 12 is a table used in explaining the processing of the FIG. 11 instruction sequence by the computer system of FIG. 10.

DESCRIPTION OF THE PREFERRED EMBODIMENTS

Figure 1:
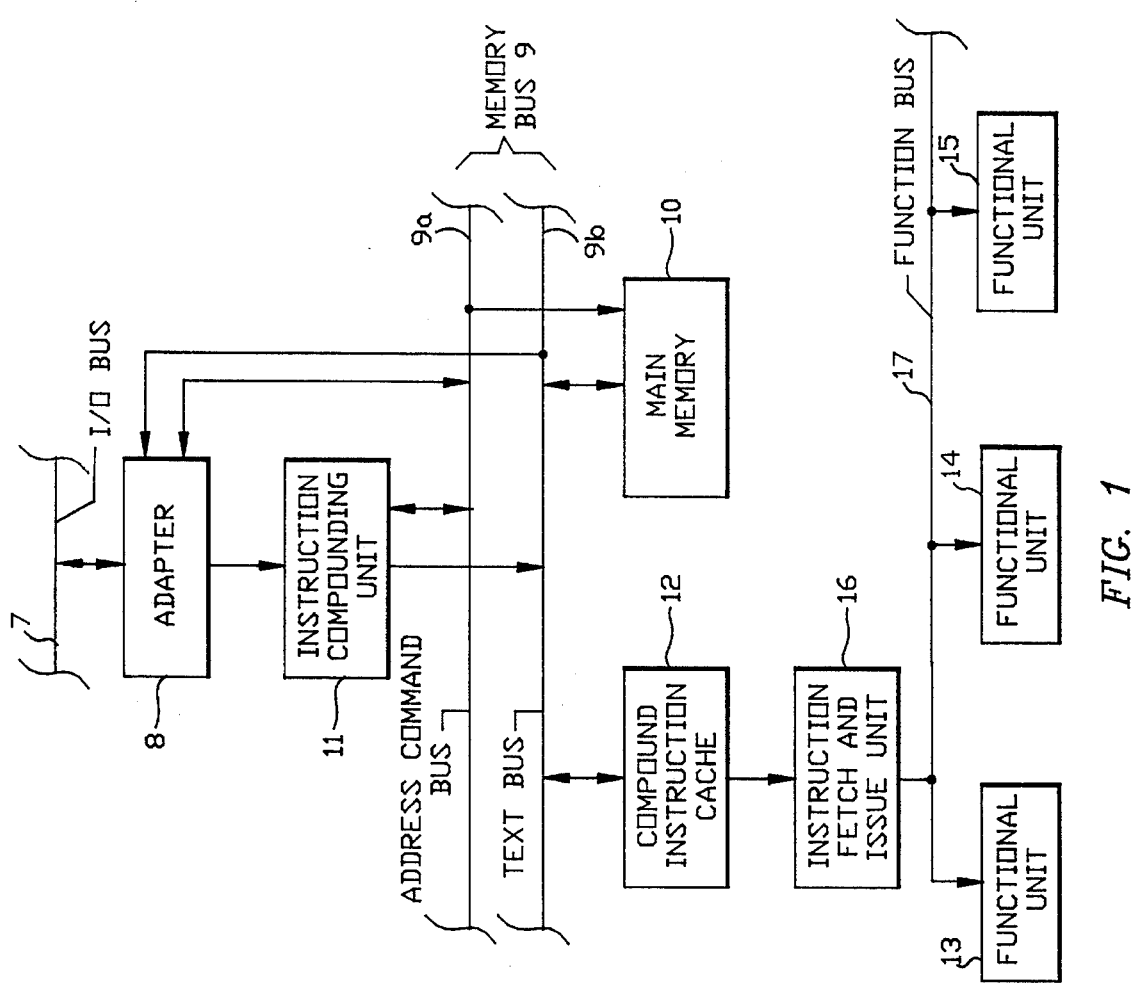
FIG. 1 shows a representative embodiment of a portion of a digital computer system constructed in accordance with present invention.

Referring to FIG. 1 of the drawings, there is shown a representative embodiment of a portion of a digital computer system or digital data processing system constructed in accordance with this invention. The illustrated computer system is capable of executing two or more instructions in parallel. It includes a hierarchically-arranged storage system in which auxiliary or secondary storage devices are connected via an I/O bus to a computer. The computer interfaces with the I/O bus through an adaptor which is also connected to a memory bus. The main memory and a high-speed cache are connected to the memory bus.

This hierarchy typically permits the computational components of the computer system to directly access or refer to the contents of the main memory and, the cache, while the adaptor provides access to the auxiliary storage. Instructions and data which must be accessed or referenced to support current computer operations are kept in the memory. When no longer required, these are returned to the auxiliary memory by way of the adaptor, while new instructions and data are entered into the main memory. The cache supports high-speed access by the CPU and is used to store instructions and data which are currently being used or are highly likely to be used next by the CPU. Hierarchical storage structures are explained in detail in Chapter 7 of Deitel's OPERATING SYSTEMS, second edition, 1990.

Referring now to FIG. 1 of the drawing, a representative embodiment of a portion of a digital computer system having a hierarchically-arranged memory structure is shown in accordance with the present invention. This computer system is capable of processing two or more instructions in parallel. It includes a first storage mechanism for storing instructions and data to be processed. The storage mechanism is identified as a main memory 10. The main memory 10 is connected to a memory bus 9 having an address and command bus 9a and a text bus 9b. The main memory 10 exchanges instructions and data over the memory bus with an IO adaptor 8. The IO adaptor 8 is connected to the memory bus 9 and to an IO bus 7. It is asserted that one or more auxiliary storage devices (not shown) are coupled to the IO bus 7. The adaptor 8 transfers data over the IO bus 7 by storing program information to and obtaining program information from the auxiliary storage devices. The adaptor 8 also exchanges program data on the memory bus 9 with the main memory 10 by providing instructions and data to and receiving instructions and data from the main memory over the bus 9. The adaptor 8 buffers instructions and data between the buses 7 and 9, which may have differing speeds and formats. Last, the adaptor 8 also includes checking and error functions. An IO adaptor corresponding to the component indicated by reference number 8 is found in, for example, the channelized IO subsystem of the model 3090 computer system, available from IBM Corporation, the assignee of this patent application.

The main memory 10 is a relatively large capacity, medium-speed storage mechanism which is connected by way of the memory bus 9 to a lower capacity, higher-speed cache. This cache is identified as a compound instruction cache 12.

The computer system in FIG. 1 also includes an instruction compounding mechanism 11 for receiving instructions from the adaptor 8 and associating with those instructions compound tag information in the form of tag fields indicating which of these instructions may be processed in parallel. This instruction compounding mechanism is represented by instruction compounding unit 11. The compounding unit 11 analyzes the incoming instructions for determining which ones may be processed in parallel. Furthermore, the instruction compounding unit 11 produces for those analyzed instructions compounding tag information in the form of tag fields which indicate which instructions may be processed in parallel with one another and which ones may not be processed in parallel with one another.

In FIG. 1, instructions are provided to the computing system from an auxiliary storage device by way of the adaptor 8, the instruction compounding unit 11, and the main memory 10. The main memory 10 receives and stores the analyzed instructions and their associated tag fields. The main memory 10 then provides the analyzed instructions and their associated tag fields to the compound instruction cache 12. The cache 12 has a smaller capacity and higher speed than the main memory 10 and is of the kind commonly used for improving performance rate of a computer system by reducing the frequency of the access to the main memory 10.

The computer system of FIG. 1 also includes a plurality of functional instruction processing units. These functional instruction processing units are represented by functional units 13, 14, 15 and so on. These functional units 13–15 operate in parallel with one another in a concurrent manner and each, on its own, is capable of processing one or more type of machine-level instructions. Examples of functional units which may be used include a general purpose arithmetic and logic unit (ALU) and address generation type ALU, a data dependency collapsing ALU of the type taught U.S. Pat. No. 5,051,940 granted Sep. 24, 1991, a branch instruction processing unit, a data shifting unit, a floating-point processing unit, and so on. A given computer system may include two or more of some of these types of functional units. For example, a given computer system may include two or more general purpose ALU's. Also, a given computer system may include each and every one of these different types of functional units. The particular configuration of functional units will depend on the nature of the particular computer system being considered.

The computer system of FIG. 1 also includes an instruction fetch and issue mechanism coupled to the compound instruction cache 12 for supplying adjacent instructions stored therein to different ones of the functional instruction processing units 13–15 when the instruction tag fields indicate that they may be processed in parallel. This mechanism is represented by instruction fetch and issue unit 16. Instruction fetch and issue unit 16 fetches instructions from cache 12, examines their tag fields and operation code (OP code) fields and, based upon such examinations, sends the instructions to the appropriate ones of the functional units 13–15. If a desired instruction is resident in the compound instruction cache 12, the appropriate address is sent to the cache 12 to fetch therefrom the desired instruction. This is sometimes referred to as a "cache hit". If the requested instruction does not reside in the cache 12, then it must be fetched from the main memory 10 and brought in to the cache 12. This is sometimes referred to as a "cache miss". When a miss occurs, the address of the requested instruction is sent to the main memory 10. In response thereto, the main memory 10 commences the transfer out or read out of a line of instructions which includes the requested instruction, together with the tag fields of the instructions in the line.

A cache miss causes reference to be made to the main memory 10 to determine whether the requested instruction is contained in the memory 10. In this regard, instructions are commonly stored in the main memory in blocks called "pages" and the memory management facility (not shown) of the computing system is able to determine from the requested instruction whether the page which contains it is in the main memory. If the page is in the main memory, the line containing the instruction is transferred out or read out of the main memory 10 into the cache 12. However, if the page containing the requested instruction is not in main memory 10, a "page fault" occurs requiring the missing page to be "fetched" from auxiliary storage and placed into the main memory 10. When a page is fetched, the identification of the missing page is sent to the adaptor 8, which retrieves it and then provides it, over the memory bus 9, for storage into the main memory 10.

In the invention, pages which are fetched for storage in the main memory 10 are transferred to the input of the instruction compounding unit 11, which unit proceeds to analyze these incoming instructions and generate the appropriate tag field for each instruction. The tags and instructions are thereafter applied to the main memory 10 and stored therein for subsequent placement, if needed, in the compound instruction cache 12.

Although the instruction compounding unit 11 is illustrated in FIG. 1 as being connected between the adaptor 8 and the main memory 10, it is contemplated that the unit may be a separate drop on the memory bus 9 or connected at the input to the main memory 10.

Storage of compounded instructions in the main memory 10 can be implemented in a number of ways, some of which are illustrated in FIGS. 2A–2D. The examples in FIGS. 2A–2D assume an 8-byte wide text bus 9b plus extra lines for the tag information. In general, it is assumed that the basic memory transfer between the main memory 10 and the compound instruction cache 12 involves a 64-byte cache line, with one tag bit for each two bytes of instruction text. One cache line is shown in each of the examples of FIGS. 2A–2D. In general, the number of tag bits is determined by the maximum number of instructions to be compounded and the information available to the instruction compounding unit 11. These considerations are covered in U.S. application Ser. Nos. 07/519,382 filed May 4, 1990 and now abandoned in favor of continuation U.S. Ser. No. 08/015,272 filed Feb.

5, 1993, now abandoned, and U.S. Pat. No. 5,051,940 granted Sep. 24, 1991.

Figure 2A:
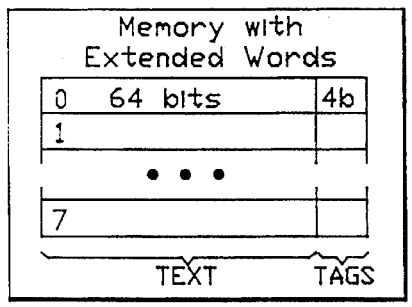
FIGS. 2A, 2B, 2C, and 2D illustrate alternative implementations for storage of compounding tag information in main memory.

The simplest tag storage implementation from a control point of view is illustrated in FIG. 2A. If it is assumed that compounding is limited to two instructions, a minimum of a one-bit tag for each two bytes of instruction text is required. Thus, for the line stored in the memory of FIG. 2A, every 64 bits (that is every eight bytes) requires four bits of compounding tag information. As illustrated in FIG. 2A storage of this information involves extension of the word size from 64 to 68 bits. Other optional tag bits would increase the size of the extended words.

Figure 2B:
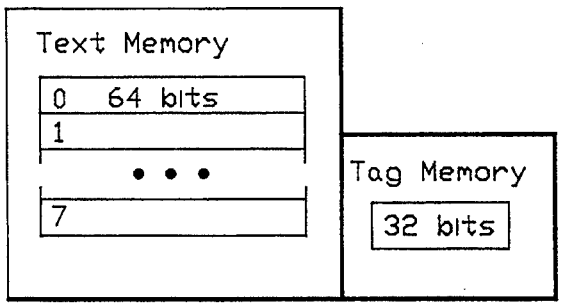

A second approach, more compatible with available memory technology is illustrated in FIG. 2B. In FIG. 2B, separate text and tag memories are provided by storage of instructions and associated compounding tag information. In FIG. 2B the tag memory operates in parallel with the text memory. Implicit in the memory structure of FIG. 2B is the requirement for an extra set of tag lines forming a tag bus on the memory bus 9 to provide parallel operation of the text and tag memories. This has several advantages over the extended word approach in FIG. 2A. First, the tag memory may cover only part of the words in main memory. The operating system uses certain parts of memory only for data pages (as opposed to instruction pages), tags are not necessary over these parts. Distinction between data and instruction pages can be a hardware decision, or one made in software and implemented by commands to the tag memory which indicate that certain pages contain data only and therefore do not require the memory page address to be mapped into the tag memory address for these pages. The second advantage is that the tag memory can be removed at will to produce a lower cost system. This broadens the performance range possible in a family of computers. If more tag bits are needed, as would be required for more than two-way compounding, a new tag memory will be substituted for the tag memory in FIG. 2B without requiring a change in the main memory design. Further, each memory can be provided with its own error correction.

With regard to FIGS. 2A-2D, it is asserted that once generated by the compounding unit, the compounding tags accompany the instruction stream in the memory, whether woven into the stream, appended to sections of it, or maintained in parallel with it.

Figure 2C:
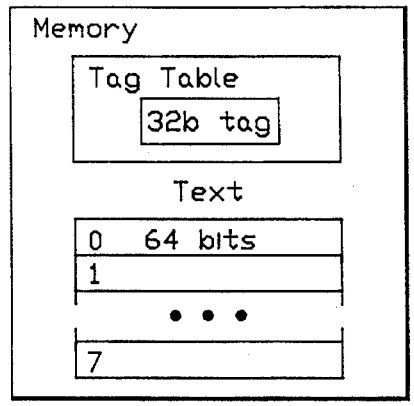
Figure 2D:
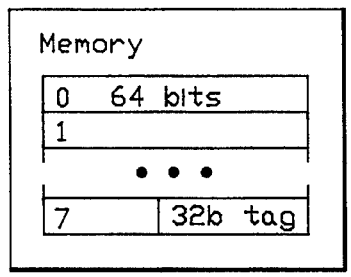

Other approaches to implementing tag storage are illustrated in FIG. 2C and 2D. In FIG. 2C, a first section of the main memory contains tag tables, and a second storage of instruction text pages. In this example, operating system support is required to reserve the tag table portion of the memory and pair memory pages with tag pages. In FIG. 2D, portions of each page are reserved for tags. This requires a capability in the compiler for page construction. For example, with 64 byte cache lines, a compiler would use 60 bytes for instructions and 4 bytes for tags. In FIG. 2D tags are paired with instruction bytes in the instruction cache when requested by the CPU.

An implication of the computer system in FIG. 1 is that the instruction compounding unit 11 can form a part of the bus adaptor 8. Thus when any page is brought in from the IO system, it is subjected to the compounding process implicit in the unit 11 and moved on the memory bus 9 to the main memory 10. From hereon, the discussion assumes a page structure according to FIG. 2A, implying that the text bus 9b is 68 bits wide and that the main memory is configured and controlled to store pages such as that illustrated in FIG. 2A. Of course, the compounding instruction cache 12 is configured and controlled to receive lines including extended words as illustrated in FIG. 2A.

Figure 3:
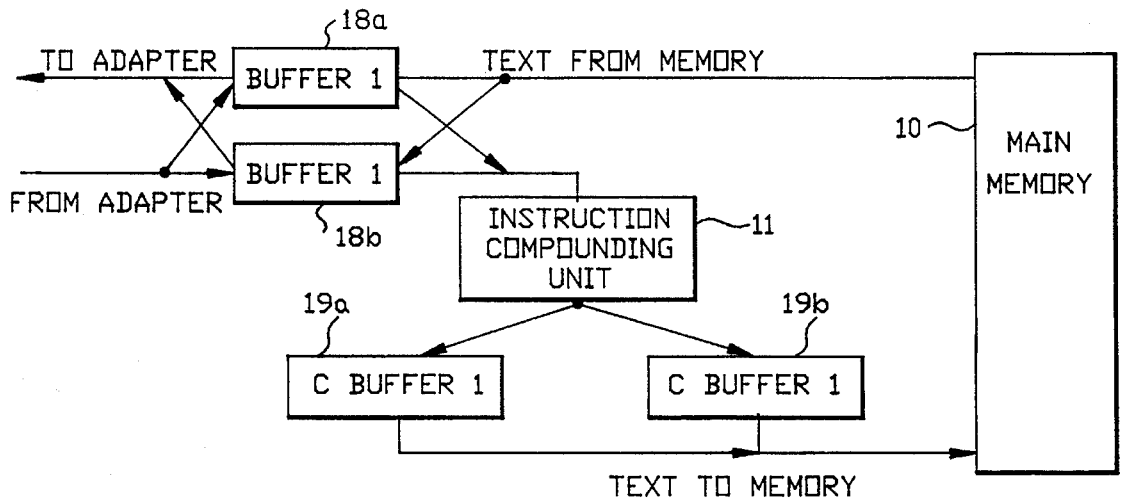
FIG. 3 shows in greater detail the data flow structure between an IO adaptor and the main memory in the computer system of FIG. 1.
Figures 4, 5A, 5B, 9:
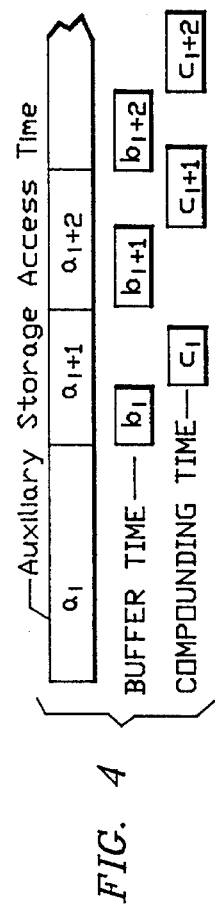
FIG. 4 is a timing diagram for instruction transfer in the data flow structure of FIG. 3.
FIG. 5a shows a length of an instruction stream having compounding tags or tag fields associated with the instructions.
FIG. 5b shows a length of an instruction stream having instruction boundary fields associated with the instructions.
FIG. 9 is a table used in explaining the operation of the FIG. 8 example.

Upon a page fault, a page is loaded into a page buffer in the adaptor 8 and provided to the instruction compounding unit 11 as described below. In FIG. 3, two page buffers 18a and 18b send a sequence of pages to the instruction compounding unit 11 which undertakes compounding operations by adding compounding tag information to page instructions. Pages processed by the compounding unit 11 are fed to the main memory 10 through compounded page buffers 19a and 19b. As FIG. 4 shows, the compounding unit adds time to that required to fetch a text segment from auxiliary storage and enter it into the main memory 10. However, the time added is small relative to the total time required, and is asynchronous to the CPU.

In FIG. 4, each segment i is transferred from an auxiliary storage device such as a disk drive to one of the page buffers 18a or 18b. Each of the time segments $b_i$ indicate the time required to transfer text segment i from a page buffer to the main memory 10. Thus, text segment i is transferred in time $a_i$ into one of the page buffers 18a or 18b, following which text segment i+1 is transferred to the other of the buffers. Without compounding, text segment i is transferred in time $b_i$ from the page buffer, where it is currently stored, into the main memory. As FIG. 4 shows, this time is substantially shorter than the time required to fetch a page to one of the buffers 18a or 18b. With the practice of this invention, the time required for the operation of the compounding unit 11 to be performed on a text segment in one of the page buffers plus the time spend in a compounded buffer 19a or 19b is represented by compound time $c_i$. Now, in FIG. 4, the time $b_i$ is that required to transfer text segment i from a page buffer to the compounding unit 11. Next the compounding time $c_i$ is incurred while text segment i is subjected to the process of the compounding unit 11. As FIG. 4 shows, the sum of the time $b_i$ and $c_i$ is less than the time $a_i$. Recall that the superscaler machine must decide at instruction execution time whether instructions may be executed in parallel. This decision is a discrete step in instruction execution, thereby adding substantially to execution time in the superscaler machine. Contrastingly, as FIG. 4 illustrates, compounding in the computer system of FIG. 1 does not significantly extend the time required to perform computer operations. Thus, the instruction compounding unit 11 offers greater performance than a compounder located at the instruction execution unit.

FIGS. 3 and 4 illustrate two principal advantages of compounding in main memory. First, the compounding can be made part of the asynchronous page fault process without extending the time to complete that process. Second, compounding of large blocks of instruction text, such as pages, provides a larger scope of consideration for compounding, which can result in more optimized. compounding. A consequence of this is that an in-memory instruction compounding unit, such as that illustrated in FIG. 1, will provide performance advantages, as the CPU will always execute instructions that have been compounded and the compounding can be better optimized than when performed synchronously on a smaller section of instruction text.

The operation of the instruction compounding unit will now be explained beginning with reference to FIG. 5a. FIG. 5a shows a portion of a stream of compounded or tagged instructions as they might appear at the output of the instruction compounding unit 11 of FIG. 1. As is seen, each instruction (Instr.) has a tag field added to it by the instruction compounding unit 11. The tagged instructions, like those shown in FIG. 5a are stored into the main memory in the page block for the page containing the instructions. As needed, tagged instructions in the main memory 10 are transferred to the cache 12 when a "miss" occurs. Thereafter, the tagged instructions in the cache 12 are fetched by the instruction fetch and issue unit 16. As the tagged instructions are received by the fetch and issue unit 16, their tagged fields are examined to determine if they may be processed in parallel and their operation code (OP CODE) fields are examined to determine which of the available functional units is most appropriate for their processing. If the tag fields indicate that two or more of the instructions are suitable for processing in parallel, then they are sent to the appropriate ones of the functional units in accordance with the codings of their OP CODE fields. Such instructions are then processed concurrently with one another by their respective functional units.

When an instruction is encountered that is not suitable for parallel processing, then it is sent to the appropriate functional unit as determined by its OP CODE and it is thereupon processed alone and by itself by the selected functional unit.

In the most perfect case, where plural instructions are always being processed in parallel, the instruction execution rate of the computer system would be N times as great as for the case where instructions are executed one at a time, with N being the number of instructions in the groups which are being processed in parallel.

The tagged instruction stream of FIG. 5a is easier to preprocess by an instruction compounding unit if known reference points exist to indicate where instructions begin. Such a reference point will provide precise knowledge of where an instruction boundary occurs. In many computer systems, instruction boundaries are expressly known only by a compiler at compile time and only by a CPU when instructions are fetched. A boundary reference point is unknown between compile time and instruction fetch unless a special boundary reference scheme is adopted. Such a scheme is illustrated in FIG. 5b by instruction boundary bits B. As FIG. 5b illustrates, the boundary bits may be placed in the instruction stream by the compiler at compile time to provide a reference for instruction alignment just prior to compounding. Generally, the patent applications entitled "Scalable Compound Instruction Set Machine Architecture" and "general Purpose compound Apparatus for Instruction-Level Parallel Processors" deal with the considerations of compounding with text streams in which instruction boundaries are indefinite. Of course, where instruction boundaries are determinable from the text stream, as where the stream includes only instructions and all instructions are the same length, boundary definition is unnecessary.

DESCRIPTION OF FIGURE 6 INSTRUCTION COMPOUNDING UNIT

Figure 6:
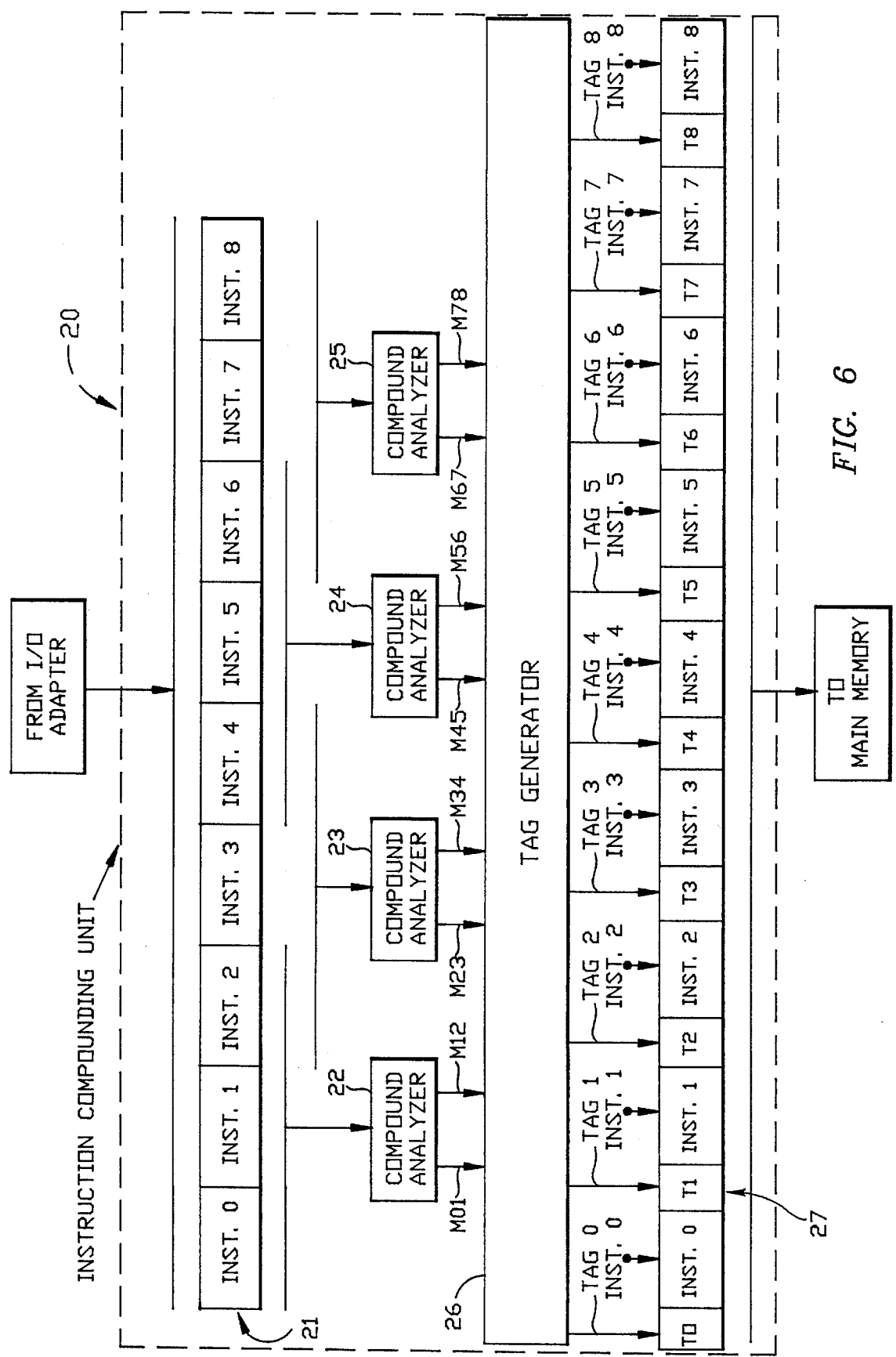
FIG. 6 shows in greater detail the internal construction of a representative embodiment of an instruction compounding unit which can be used in the computer system of FIG. 1.

FIG. 6 shows in greater detail the internal construction of a representative embodiment of an instruction compounding unit in accordance with the present invention. This instruction compounding unit 20 is suitable for use as the instruction compounding unit 11 of FIG. 1. The instruction compounding unit 20 of FIG. 6 is designed for the case where a maximum of two instructions at a time may be processed in parallel. However, this is not meant to limit the invention only to pairwise compounding. In this example, a 1-bit tag field is used. A tag bit value of "1" (one) means that the instruction is a "first" instruction. A tag bit value of "0" (zero) means that the instruction is a "second" instruction and may be executed in parallel with the preceding first instruction. An instruction having a tag bit value of 1 may be executed either by itself or at the same time and in parallel with the next instruction, depending upon the tag bit value for such next instruction.

Each pairing of an instruction having a tag bit value of one with a succeeding instruction having a tag bit value of zero forms a compound instruction for parallel execution purposes, that is, the instructions in such a pair may be processed in parallel with one another. When the tag bits for two succeeding instructions each have a value of one, the first of these instructions is executed by itself in a nonparallel manner. In the worst possible case, all of the instructions in the sequence would have a tag bit value of one. In this worst case, all of the instructions would be executed one at a time in a nonparallel manner.

At the input to the instruction compounding unit 20, an instruction alignment unit receives from the I/O adaptor the instruction stream which is to be compounded. The instruction stream may include boundary bits B, as illustrated in FIG. 5b. In this case, instruction alignment is simply a matter of detecting boundary bits and decoding instruction OP codes. As is known, in the IBM System/370 instruction set, OP codes include bits which give instruction length in bytes or half words. Therefore, once a boundary bit B has been identified for an instruction, the next instruction can be unambiguously identified by counting the number of bytes or half words from the boundary bit. Instruction alignment is not a feature of this invention, it being understood that instruction boundaries are identified by any known method, including the use of boundary bits.

The instruction compounding unit 20 of FIG. 6 includes a plural-instruction instruction register 21 for receiving a plurality of successive instructions from the page buffers 18a and 18b of the adapters. Instruction compounding unit 20 also includes a plurality of rule-based instruction analyzer mechanisms. Each such instruction analyzer mechanism analyzes a different pair of side-by-side instructions in the instruction register 21 and produces a compoundability signal which indicates whether or not the two instructions in its pair may be processed in parallel. In FIG. 6, there are shown a plurality of compound analyzer units 22–25. Each of these compound analyzer units 22–25 includes two of the instruction analyzer mechanisms just mentioned. Thus, each of these analyzers units 22–25 produces two of the compoundability signals. For example, the first compound analyzer unit 22 produces a first compoundability signal M01 which indicates whether or not Instructions 0 and 1 may be processed in parallel. Compound analyzer unit 22 also produces a second compoundability signal M12 which indicates whether or not Instructions 1 and 2 may be processed in parallel.

In a similar manner, the second compound analyzer unit 23 produces a first compoundability signal M23 which indicates whether or not Instructions 2 and 3 may be processed in parallel and a second compoundability signal M34 which indicates whether Instructions 3 and 4 may be processed in parallel. The third compound analyzer 24 produces a first compoundability signal M45 which indicates whether or not Instructions 4 and 5 may be processed in parallel and a second compoundability signal M56 which indicates whether or not Instructions 5 and 6 may be processed in parallel. The fourth compound analyzer 25 produces a first compoundability signal M67 which indicates whether or not Instructions 6 and 7 may be processed in parallel and a second compoundability signal M78 which indicates whether Instructions 7 and 8 may be processed in parallel.

The instruction compounding unit 20 further includes a tag generating mechanism 26 responsive to the compoundability signals appearing at the outputs of the analyzer units 22–25 for generating the individual tag fields for the different instructions in the instruction register 21. These tag fields T0, T1, T2 etc. are supplied to a tagged instruction register 27, as are the instructions themselves, the latter being obtained from the input instruction register 21. In this manner, there is provided in the compounding unit output register 27 a tag field T0 for Instruction 0, a tag field T1 for Instruction 1, etc.

In the present embodiment, each tag field T0, T1, T2, etc. is comprised of a single binary bit. A tag bit value of "one" indicates that the immediately following instruction to which it is attached is a "first" instruction. A tag bit value of "zero" indicates that the immediately following instruction is a "second" instruction. An instruction having a tag bit value of one followed by an instruction having a tag bit value of zero indicates that those two instructions may be executed in parallel with one another. The tagged instructions in the compounding unit output register 27 are supplied to the input of the main memory 10 of FIG. 1 via one or the other of the compounding buffers 19a or 19b of FIG. 3. The compounded instructions are stored into the main memory 10.

Figure 7:
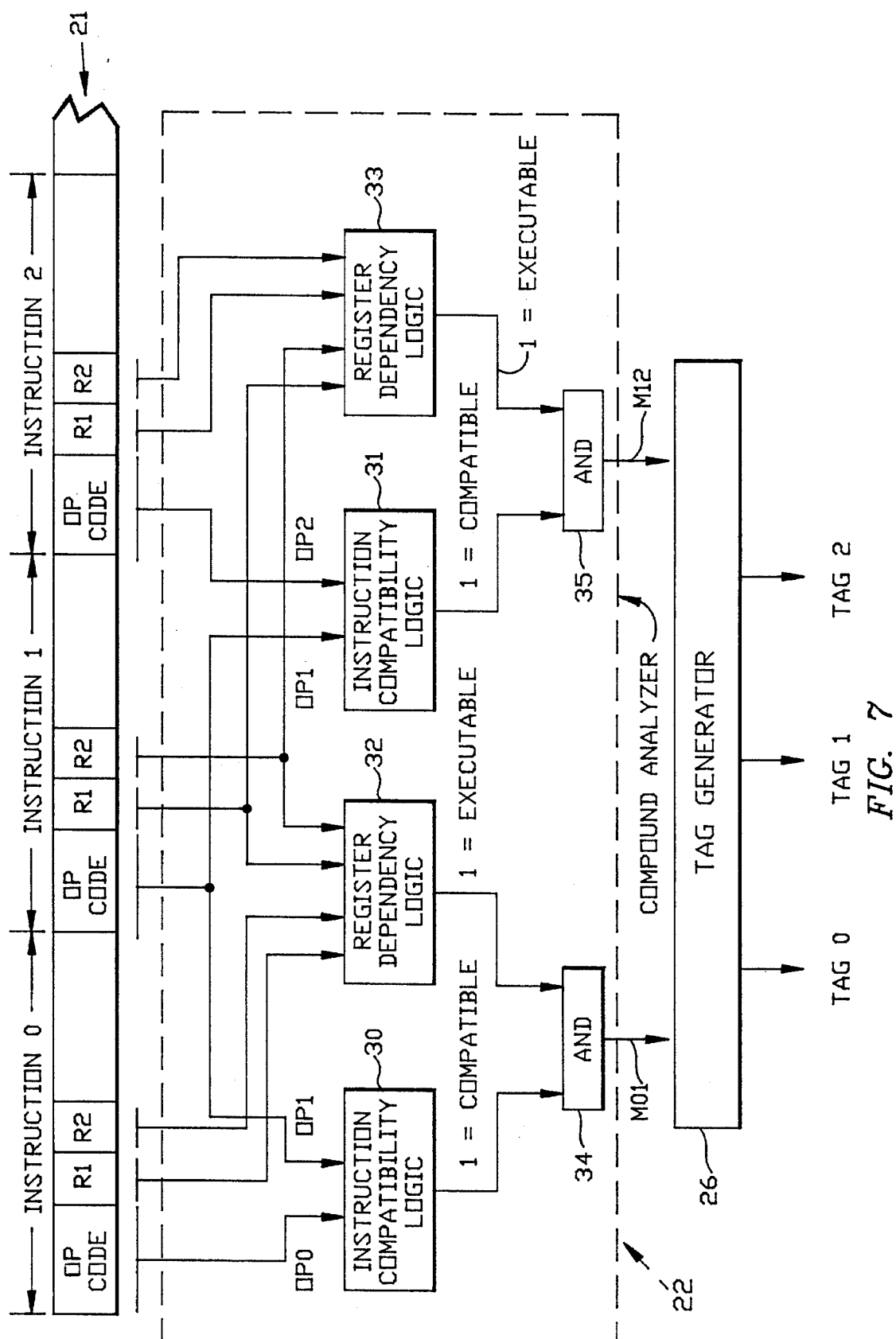
FIG. 7 shows in greater detail a representative internal construction for each of the compound analyzer units of FIG. 3.

Referring now to FIG. 7, there is shown in greater detail the internal construction used for the compound analyzer unit 22 of FIG. 6. The other compound analyzer units 23–25 are of a similar construction. As shown in FIG. 7, the compound analyzer 22 includes instruction compatibility logic 30 for examining the op code of Instruction 0 and the op code of Instruction 1 and determining whether these two op codes are compatible for purposes of execution in parallel. Logic 30 is constructed in accordance with predetermined rules to select which pairs of op codes are compatible for execution in parallel. More particularly, logic 30 includes logic circuitry for implementing rules which define which types of instructions are compatible for parallel execution in the particular hardware configuration used for the computer system being considered. If the op codes for Instruction 0 and 1 are compatible, then logic 30 produces at its output a binary one level signal. If they are not compatible, logic 30 produces a binary zero value on its output line.

Compound analyzer 22 further includes a second instruction compatibility logic 31 for examining the op codes of Instructions 1 and 2 and determining whether they are compatible for parallel execution. Logic 31 is constructed in the same manner as logic 30 in accordance with the same predetermined rules used for logic 30 to select which pairs of op codes are compatible for execution in parallel for the case of Instructions 1 and 2. Thus, logic 31 includes logic circuitry for implementing rules which define which types of instructions are compatible for parallel execution, these rules being the same as those used in logic 30. If the op codes for Instructions 1 and 2 are compatible, then logic 31 produces a binary one level output. Otherwise, it produces a binary zero level output.

Compound analyzer 22 further includes first register dependency logic 32 for detecting conflicts in the usage of the general purpose registers designated by the R1 and R2 fields of Instructions 0 and 1. These general purpose registers will be discussed in greater detail hereinafter. Among other things, dependency logic 32 may be constructed to detect the occurrence of a data dependency condition wherein a second instruction (Instruction 1) needs to use the results obtained by the performance of the proceeding instruction (Instruction 0). In this case, either the second instruction can be executed by the dependency collapsing hardware, thus executing in parallel with the first instruction, or the execution of the second instruction must await completion of the execution of the preceding instruction and, hence, cannot be executed in parallel with the preceding instruction. (It is noted that a technique for circumventing some data dependencies of this type will be discussed hereinafter.) If there are no register dependencies which prevent execution of Instructions 0 and 1 in parallel, then the output line of logic 32 is given a binary value of one. If there is a dependency, then it is given a binary value of zero.

Compound analyzer 22 further includes second register dependency logic 33 for detecting conflicts in the usage of the general purpose registers designated by the R1 and R2 fields of Instructions 1 and 2. This logic 33 is one of the same construction as the previously discussed logic 32 and produces a binary one level output if there are no register dependencies or the register dependencies can be executed by the data dependency collapsing hardware, and a binary zero level output otherwise.

The output lines from the instruction compatibility logic 30 and the register dependency logic 32 are connected to the two inputs of an AND circuit 34. The output line of AND 34 has a binary one value if the two op codes being considered are compatible and if there are no register dependencies. This binary one value on the AND 34 output line indicates that the two instructions being considered are compatible, that is, are executable in parallel. If, on the other hand, the AND 34 output line has a binary value of zero, then the two instructions are not compoundable. Thus, there is produced on the AND 34 output line a first compoundability signal M01 which indicates whether or not Instructions 0 and 1 may be processed in parallel. This M01 signal is supplied to the tag generator 26.

The output lines from the second compatibility logic 31 and the second dependency logic 33 are connected to the two inputs of AND circuit 35. AND 35 produces on its output line a second compoundability signal M12 which has a binary value of one if the two op codes being considered (op codes for Instructions 1 and 2) are compatible and if there are no register dependencies for Instructions 1 and 2 or register dependencies that can be executed by the data dependency collapsing hardware. Otherwise, the AND 35 output line has a binary value of zero. The output line from AND 35 runs to a second input of the tag generator 26.

The other compound analyzers 23–25 shown in FIG. 6 are of the same internal construction as shown in FIG. 7 for the first compound analyzer.

Figure 8:
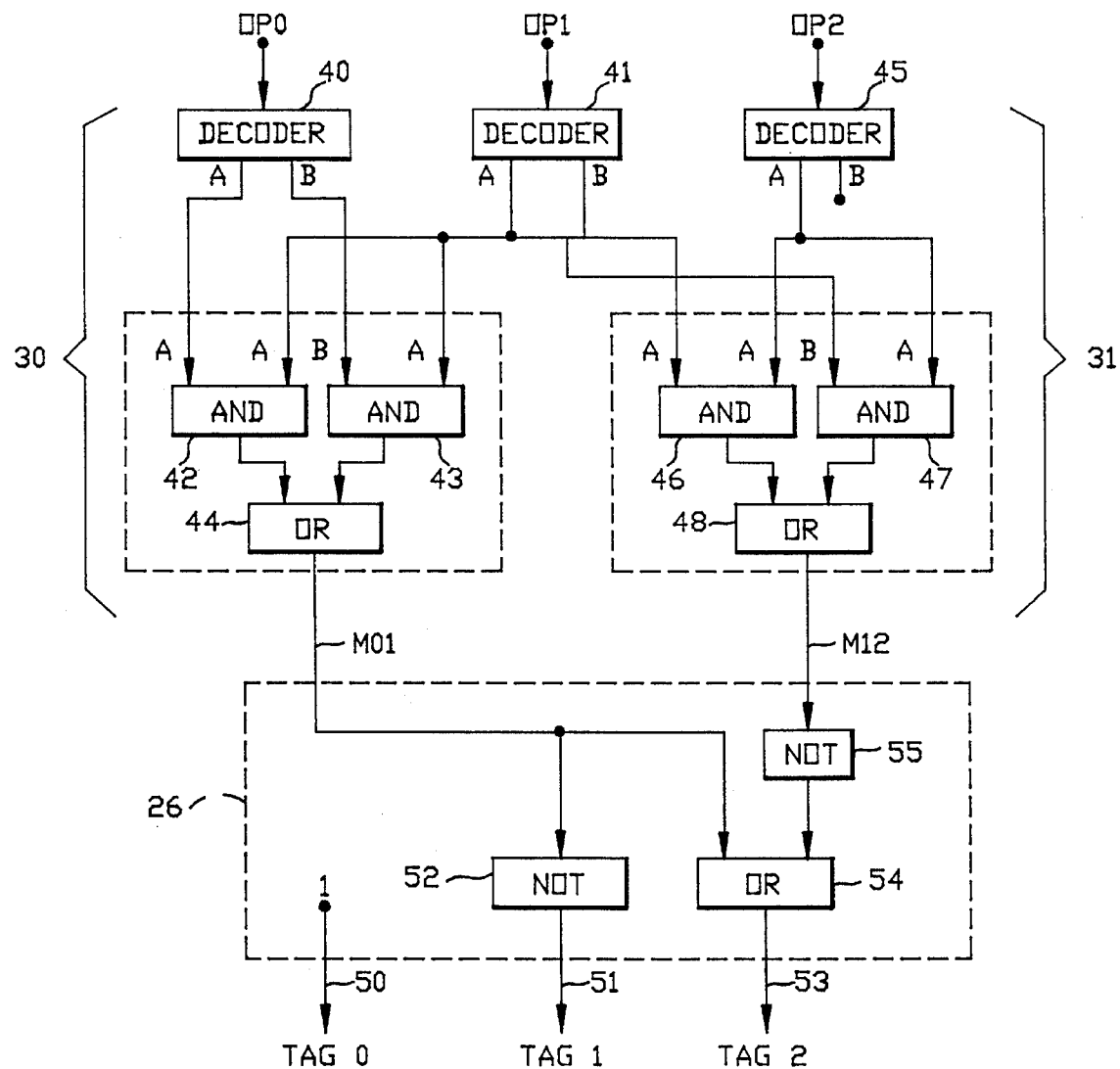
FIG. 8 shows an example of logic circuitry that may be used to implement the compound analyzer and tag generator portions of FIG. 6 which produce the compounding tags for the first three instructions in the instruction stream.

Referring now to FIG. 8, there is shown an example of the logic circuitry that can be used to implement the compound analyzer 22 and the portion of the tag generator 26 which is used to generate the first three tags, Tag 0 and Tag 1 and Tag 2. For the example of FIG. 5, it is assumed that there are two categories of instructions which are designated as category A and category B. The rules for compounding these categories of instructions are assumed to be as follows:
(1) A can always compound with A
(2) A can never compound with B
(3) B can never compound with B
(4) B can always compound with A
(5) Rule (4) has preference over Rule (1).

Note that these rules are sensitive to the order of occurrence of the instructions.

It is further assumed that these rules are such that when they are observed, there will be no problems with register dependencies because the rules implicitly indicate that in case there is any interlock, such an interlock is always executable by the data dependency collapsing hardware. In other words, it is assumed for the FIG. 8 example, that the register dependency logics 32 and 33 of FIG. 7 are not needed. In such case, AND circuits 34 and 35 are also not needed and the output of logic 30 becomes the M01 signal and the output of logic 31 becomes the M12 signal.

For these assumptions, FIG. 8 shows the internal logic circuitry that may be used for the instruction compatibility logic 30 and the instruction compatibility logic 31 of FIG. 7. With reference to FIG. 8, the instruction compatibility logic 30 includes decoders 40 and 41, AND circuits 42 and 43 and OR circuit 44. The second instruction compatibility logic 31 includes decoders 41 and 45, AND circuits 46 and 47 and OR circuit 48. The middle decoder 41 is shared by both logics 30 and 31.

The first logic 30 examines the op codes OP0 and OP1 of Instructions 0 and 1 to determine their compatibility for parallel execution purposes. This is done in accordance with Rules (1)–(4) set forth above. Decoder 40 looks at the op code of the first instruction and if it is a category A op code, the A output line of decoder 40 is set to the one level. If OP0 is a category B op code, then the B output line of decoder 40 is set to a one level. If Op0 belongs to neither category A nor category B, then both outputs of decoder 40 are at the binary zero level. The second decoder 41 does a similar kind of decoding for the second op code OP1.

AND circuit 42 implements Rule (1) above. If OP0 is a category A op code and OP1 is also a category A op code, then AND 42 produces a one level output. Otherwise, the output of AND 42 is a binary zero level. AND 43 implements Rule (4) above. If the first op code is a category B op code and the second op code is a category A op code, then AND 43 produces a one level output. Otherwise, it produces a zero level output. If either AND 42 or AND 43 produces a one level output, this drives the output of OR circuit 44 to one level, in which case, the compoundability signal M01 has a value of one. This one value indicates that the first and second instructions (Instructions 0 and 1) are compatible for parallel execution purposes.

If any other combination of op code categories is detected by decoders 40 and 41, then the outputs of AND 42 and 43 remain at the zero level and compoundability signal M01 has the noncompoundability-indicating value of zero. Thus, the occurrence of the combinations indicated by Rules (2) and (3) above do not satisfy AND's 42 and 43 and M01 remains at the zero level. If there are further categories of op codes in addition to categories A and B, their occurrences in the instruction stream do not activate the outputs of decoders 40 and 42. Hence, they likewise result in an M01 compoundability signal value of zero.

The second instruction compatibility logic 31 performs a similar type of op code analysis for the second and third instructions (Instructions 1 and 2). If the second op code OP1 is a category A op code and the third op code OP2 is a category A op code, then, per Rule (1), AND 46 produces a one level output and the second compoundability signal M12 is driven to the Compoundability-indicating binary one level. If, on the other hand OP1 is a category B op code and OP2 is a category A op code, then, per Rule (4), AND 47 is activated to produce a binary one level for the second compoundability signal M12. For any op code combination other than those set forth in Rules (1) and (4), the M12 signal has a value of zero.

The M01 and M12 compoundability signals are supplied to the tag generator 26. FIG. 8 shows the logic circuitry that can be used in tag generator 26 to respond to the M01 and M12 compoundability signals to produce the desired tag bit values for Tags 0, 1 and 2. A tag bit value of one indicates that the associated instruction is "first" instruction for parallel execution purposes. A tag bit value of zero indicates that the associated instruction is a "second" instruction for parallel execution purposes. The only instruction in the pair has a tag bit value of zero. Any instruction having a tag bit value of one which is followed by another instruction having a tag bit value of one is executed by itself in a singular manner and not in parallel with the following instruction.

For the case of the first row in FIG. 9, all three tag bits have a value of one. This means that each of Instructions 0 and 1 will be executed in a singular, nonparallel manner. For the second row of FIG. 2, Instructions 0 and 1 will be executed in parallel since Tag 0 has the required one value and Tag 1 has the required zero value. For the third row in FIG. 9, Instruction 0 will be executed in a singular manner, while Instructions 1 and 2 will be executed in parallel with one another. For the fourth row, Instructions 0 and 1 will be executed in parallel with one another.

For those cases where Tag 2 has a binary value of one, the status of its associated Instruction 2 is dependent on the binary value for Tag 3. If Tag 3 has a binary value of zero, then Instructions 2 and 3 can be executed in parallel. If, on the other hand, Tag 3 has a binary value of one, then Instruction 2 will be executed in a singular, nonparallel manner. It is noted that the logic implemented for the tag generator 26 does not permit the occurrence of two successive tag bits having binary values of zero.

An examination of FIG. 9 reveals the logic needed to be implemented by the portion of tag generator 26 shown in FIG. 8. As indicated in FIG. 9, Tag 0 will always have a binary value of one. This is accomplished by providing a constant binary value of one to tag generator output line 50 which constitutes the Tag 0 output line. An examination of FIG. 9 further reveals that the bit value for Tag 1 is always the opposite of the bit value of the M01 compoundability signal. This result is accomplished by connecting output line 51 for Tag 1 to the output of NOT circuit 52, the input of which is connected to the M01 signal line.

The binary level on Tag 2 output line 53 is determined by an OR circuit 54 and a NOT circuit 55. One input of OR 54 is connected to the M01 line. If M01 has a value of one, then Tag 2 has a value of one. This takes care of the Tag 2 values in the second and fourth rows of FIG. 9. The other input of OR 54 is connected by way of NOT 44 to the M12 signal line. If M12 has a binary value of zero, this value is inverted by NOT 55 to supply a binary one value to the second input of OR 54. This causes the Tag 2 output line 53 to have a binary one value. This takes care of the Tag 2 value for row one of FIG. 9. Note that for the row 3 case, Tag 2 must have a value of zero. This will occur because, for this case, M01 will have a value of zero and M12 will have a value of one which is inverted by NOT 55 to produce a zero at the second input of OR 54.

Implicit in the logic of FIG. 9 is a prioritization rule for the row four case where each of M01 and M12 has a binary value of one this row four case can be produced by an instruction category sequence of BAA. This could be implemented by a tag sequence of 101 as shown in FIG. 9 or, alternatively, by a tag sequence of 110. In the present embodiment, Rule (5) is followed and the 101 sequence shown in FIG. 9 is chosen. In other words, the BA pairing is given preference over the AA pairing.

The 1,1 pattern for M01 and M12 can also be produced an op code sequence of AAA. In this case, the 101 tag sequence of FIG. 9 is again selected. This is better because it provides a one value for Tag 2 and, hence, potentially enables Instruction 2 to be compounded with Instruction 3 if Instruction 2 is compatible with Instruction 3.

DESCRIPTION OF THE FIG. 10 EMBODIMENT

Figure 10:
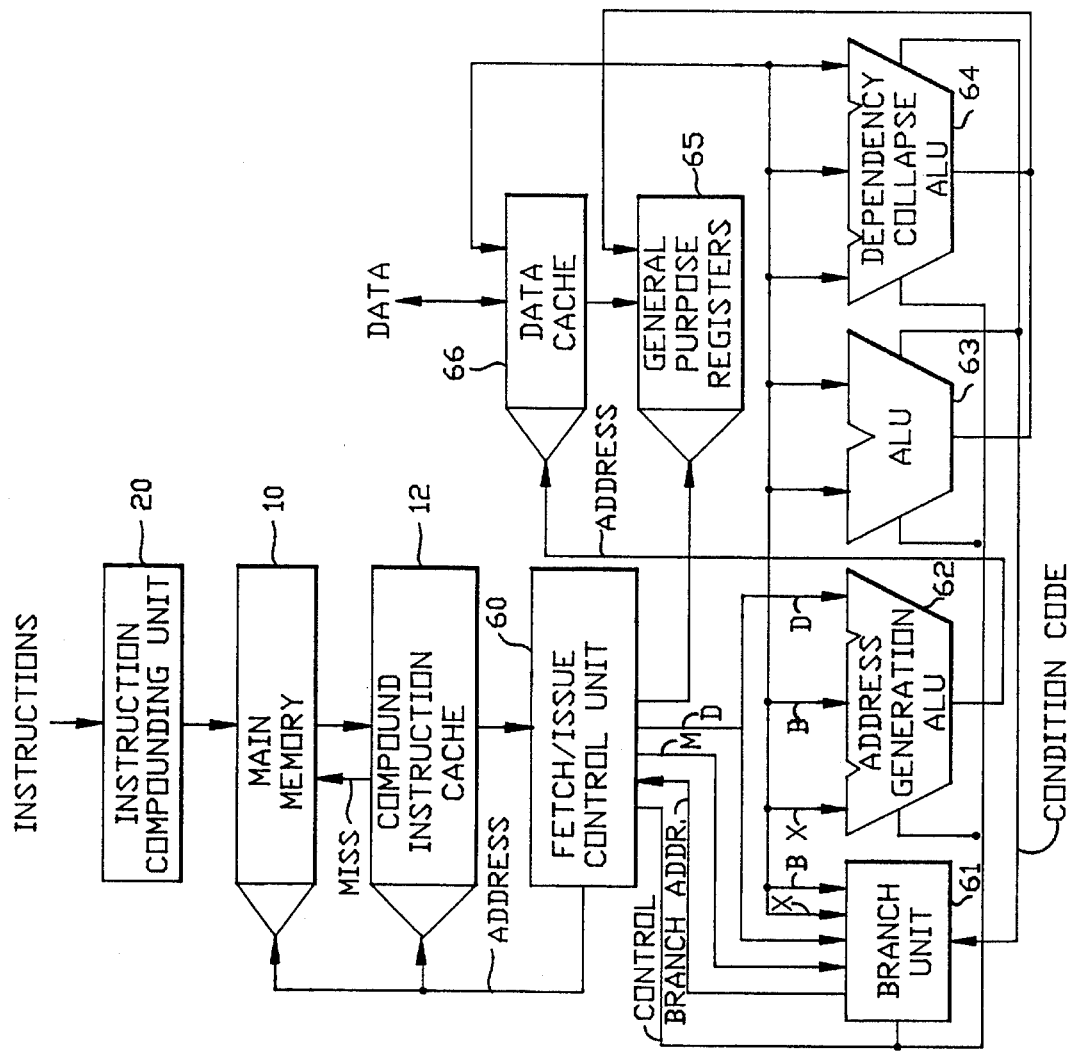
FIG. 10 shows a representative embodiment of a portion of a digital computer system and is used to explain how the compounded instructions may be processed in parallel by multiple functional instructions processing units.

Referring to FIG. 10, there is shown a detailed example of how a computer system can be constructed for using the compounding tags of the present invention to provide parallel processing of machine-level computer instructions. The instruction compounding unit 20 used in FIG. 10 is assumed to be of the type described in FIG. 6 and, as such, it adds to each instruction a one-bit tag field. These tag fields are used to identify which pairs of instructions may be processed in the parallel. Pages containing these tagged instructions are supplied to and stored into the main memory 10. As the tagged instructions are needed, they are read or transferred into the cache 12. Fetch/Issue control unit 60 fetches the tagged instructions from cache 12, as needed, and arranges for their processing by the appropriate one or ones of a plurality of functional instruction processing units 61, 62, 63 and 64. Fetch/Issue unit 60 examines the tag fields and op code fields of the fetched instructions. If the tag fields indicate that two successive instructions may be processed in parallel, then fetch/issue unit 60 assigns them to the appropriate ones of the functional units 61–64 as determined by their op codes and they are processed in parallel by the selected functional units. If the tag fields indicate that a particular instruction is to be processed in a singular, non-parallel manner, then fetch/issue unit 60 assigns it to a particular functional unit as determined by its op code and it is processed or executed by itself.

The first functional unit 61 is a branch instruction processing unit for processing branch type instructions. The second functional unit 62 is a three input address generation arithmetic and logic unit (ALU) which is used to calculate the storage address for instructions which transfer operands to or from storage. The third functional unit 63 is a general purpose arithmetic and logic unit (ALU) which is used for performing mathematical and logical type operations. The fourth functional unit 64 in the present example is a data dependency collapsing ALU of the kind described in the above-referenced U.S. Pat. No. 5,051,940 granted Sep. 24, 1991. This dependency collapsing ALU 64 is a three-input ALU capable of performing two arithmetical/logical operations in a single machine cycle.

The computer system embodiment of FIG. 10 also includes a set of general purpose registers 65 for use in executing some of the machine-level instructions. Typically, these general purpose registers 65 are used for temporarily storing data operands and address operands or are used as counters or for other data processing purposes. In a typical computer system, sixteen (16) such general purpose registers are provided. In the present embodiment, general purpose registers 65 are assumed to be one of the multiport type wherein two or more registers may be accessed at the same time.

The computer system of FIG. 10 further includes a high-speed data cache storage mechanism 66 for storing data operands obtained from the higher-level storage unit 10. Data in the cache 66 may also be transferred back to the main memory 10. Data cache 66 may be of a known type and its operation relative to the main memory 10 may be conducted in a known manner.

FIG. 11 shows an example of a compounded or tagged instruction sequence which may be processed by the computer system of FIG. 10. The FIG. 11 example is composed of the following instructions in the following sequence: Load, Add, Compare, Branch on Condition and Store. These are identified as instructions I1–I5, respectively. The tag bits for these instructions are 1,1,0,1 and 0, respectively. Because of the organization of the machine shown in FIG. 10, the Load instruction is processed in a singular manner by itself. The Add and Compare instructions are treated as a compound instruction and are processed in parallel with one another. The Branch and Store instructions are also treated as a compound instruction and are also processed in parallel with one another.

The table of FIG. 12 gives further information on each of these FIG. 11 instructions. The R/M column in FIG. 12 indicates the content of a first field in each instruction which is typically use to identify the particular one of general purpose registers 65 which contains the first operand. An exception is the case of the Branch on Condition instruction, wherein the R/M field contains a condition code mask. The R/X column in FIG. 12 indicates the content of a second field in each instruction, which field is typically used to identify a second one of the general purpose registers 65. Such register may contain the second operand or may contain an address index value (X). The B column in FIG. 12 indicates the content of a third possible field in each instruction, which field may identify a particular one of the general purpose registers 65 which contains a base address value. A zero in the B column indicates the absence of a B field or the absence of a corresponding address component in the B field. The D field of FIG. 12 indicates the content of a further field in each instruction which, when used for address generation purposes, includes an address displacement value. A zero in the D column may also indicate the absence of a corresponding field in the particular instruction being considered or, alternatively, an address displacement value of zero.

Considering now the processing of the Load instructions of FIG. 11, the fetch/issue control unit 60 determines from the tag bits for this Load instruction and the following Add instruction that the Load instruction is to be processed in a singular manner by itself. The action to be performed by this Load instruction is to fetch an operarid from storage, in this case the data cache 66, and to place such operarid into the R2 general purpose register. The storage address from which this operarid is to be fetched is determined by adding together the index value in register X, the base value in register B and the displacement value D. The fetch/issue control unit 60 assigns this address generation operation to the address generation ALU 62. In this case, ALU 62 adds together the address index value in register X (a value of zero in the present example), the base address value contained in general purpose register R7 and the displacement address value (a value of zero in the present example) contained in the instruction itself. The resulting calculated storage address appearing at the output of ALU 62 is supplied to the address input of data cache 66 to access the desired operand. This accessed operand is loaded into the R2 general purpose register in register set 65.

Considering now the processing of the Add and Compare instructions, these instructions are fetched by the fetch/issue control unit 60. The control unit 60 examines the compounding tags for these two instructions and notes that they may be executed in parallel. As seen from FIG. 12, the Compare instruction has an apparent data dependency on the Add instruction since the Add must be completed before R3 can be compared. This dependency, however, can be handled by the data dependency collapsing ALU 64. Consequently, these two instructions can be processed in parallel in the FIG. 10 configuration. In particular, the control unit 60 assigns the processing of the Add instruction to ALU 63 and assigns the processing of the Compare instruction to the dependency collapsing ALU 64.

ALU 63 adds the contents of the R2 general purpose register to the contents of the R3 general purpose register and places the result of the addition back into the R3 general purpose register. At the same time, the dependency collapsing ALU 64 performs the following mathematical operation:

R3+R2−R4

The condition code for the result of this operation is sent to a condition code register located in branch unit 61. The data dependency is collapsed because ALU 64, in effect, calculates the sum of R3+R2 and then compares this sum with R4 to determine the condition code. In this manner, ALU 64 does not have to wait on the results from the ALU 63 which is performing the Add instruction. In this particular case, the numerical results of calculated by the ALU 64 and appearing at the output of ALU 64 is not supplied back to the general purpose registers 65. In this case, ALU 64 merely sets the condition code.

Considering now the processing of the Branch instruction and the Store instruction shown in FIG. 11, these instructions are fetched from the compound instruction cache 12 by the fetch/issue control unit 60. Control unit 60 determines from the tag bits for these instructions that they may be processed in parallel with one another. It further determines from the op codes of the two instructions that the Branch instruction should be processed by the branch unit 61 and the Store instruction should be processed by the address generation ALU 62. In accordance with this determination, the mask field M and the displacement field D of the Branch instruction are supplied to the branch unit 61. Likewise, the address index value in register X and the address base value in register B for this Branch instruction are obtained from the general purpose registers 65 and supplied to the branch unit 61. In the present example, the X value is zero and the base value is obtained from the R7 general purpose register. The displacement value D has a hexadecimal value of twenty, while the mask field M has a mask position value of eight.

The branch unit 61 commences to calculate the potential branch address (0+R7+20) and at the same time compares the condition code obtained from the previous Compare instruction with the condition code mask M. If the condition code value is the same as the mask code value, the necessary branch condition is met and the branch address calculated by the branch unit 61 is thereupon loaded into an instruction counter in control unit 60. This instruction counter controls the fetching of the instructions from the compound instruction cache 12. If, on the other hand, the condition is not met (that is, the condition code set by the previous instruction does not have a value of eight), then no branch is taken and no branch address is supplied to the instruction counter in control unit 60.

At the same time that the branch unit 61 is busy carrying out its processing actions for the Branch instruction, the address generation ALU 62 is busy doing the address calculation (0+R7+0) for the Store instruction. The address calculated by ALU 62 is supplied to the data cache 66. If no branch is taken by the branch unit 61, then the Store instruction operates to store the operand in the R3 general purpose register into the data cache 66 at the address calculated by ALU 62. If, on the other hand, the branch condition is met and the branch is taken, then the contents of the R3 general purpose register is not stored into the data cache 66.

The foregoing instruction Sequence of FIG. 11 is intended as an example only. The computer system embodiment of FIG. 10 is equally capable of processing various and sundry other instruction sequences. The example of FIG. 11, however, clearly shows the utility of the compound instructions tags in determining which pairs of instructions may be processed in parallel with one another.

Each pairing of an instruction having a tag bit value of one with a succeeding instruction having a tag bit value of zero forms a compound instruction for parallel execution purposes, that is, the instructions in such a pair may be processed in parallel with one another. When the tag bits for two succeeding instructions each have a value of one, the first of these instructions is executed by itself in a nonparallel manner. In the worst possible case, all of the instructions in the sequence would have a tag bit value of one. In this worst case, all of the instructions would be executed one at a time in a nonparallel manner.

The hardware example discussed above in connection with the preferred embodiment of this invention compounds over a small scope. In this regard, each pair of adjacent instructions is analyzed to determine whether the pair can be executed in parallel. In fact, memory compounding offers the possibility of examining many compoundings over more than two instructions and choosing the best grouping available.

The examples given above also use a compounding technique that assumes knowledge of where instructions start. In the general case, instruction boundaries can be identified by the compiler, as discussed above, or by instruction decoding prior to execution. Reference is given to the applications entitled "Scalable Compounding Instruction Set Machine Architecture" and "General Purpose Compound Apparatus for Instruction-Level Parallel Processors".

Last, the instruction compounding unit has been illustrated particularly as being positioned between the I/O adaptor and the memory bus. This example is not meant to exclude any other locations in memory where the instruction compounding unit can operate. For example, it can be absorbed into the I/O adaptor, it can operate as a separate unit on the memory bus 9 (at which location it could compound either in the main memory 10 or in the compound instruction cache 12), or it can comprise a unit attached only to the main memory through a private memory port not accessible over the memory bus 9. The compounder can also function between the main memory and instruction cache, as taught in the application entitled "Compounding Preprocessor for Cache".

While we have described a preferred embodiment of our invention, it should be understood that modifications and adaptations thereof will occur to persons skilled in the art. Therefore, the protection afforded our invention should only be limited in accordance with the scope of the following claims.

We claim:

1. In a digital computer system capable of processing two or more instructions in parallel, a combination, comprising:

preparing means for preprocessing a sequence of instructions which may be executed by a plurality of functional units of the digital computer system, each functional unit being capable of processing one or more types of machine-level instructions, said preparing means providing predecode bits to indicate instructions which can be compounded for execution in parallel by one or more of said plurality of functional units of the digital computer system prior to issue for execution of a sequence of instructions to be executed by the plurality of functional units, said preparing means including in combination, (a) means for receiving a group of instructions in said sequence of instructions;

(b) an instruction compounding mechanism connected to said means for receiving the group of instructions, said instruction compounding mechanism generating for the group of instructions said predecode bits which denote a grouping of instructions which can be executed in parallel and indicate which instructions of the group of instructions taken from a sequence of existing machine instructions as a sequence of instructions may be compounded and executed in parallel in said digital computer system; and (c) a storage mechanism coupled to the instruction compounding mechanism for receiving and storing the group of instructions and the predecode bits generated for the group of instructions.

2. The combination of claim 1, further including:

a plurality of functional instruction processing units which operate in parallel with one another; and an instruction issue mechanism coupled to the storage mechanism for supplying instructions stored therein to different ones of the functional instruction processing units when said predecode bits indicate that said group of instructions may be processed in parallel.

3. The combination of claim 2, wherein the storage mechanism includes a main memory for storing a block of information including said instructions and a cache storage mechanism connected to the main memory and to the instruction issue mechanism.

4. The combination of claim 1, further including instruction executing means connected to the storage mechanism for:

fetching a plurality of instructions; and in response to predecode bits, executing a plurality of instructions in parallel.

5. The combination of claim 4, wherein the instruction execution means operates asynchronously with the instruction compounding mechanism.

6. The combination of claim 1, wherein the storage mechanism includes a main memory having a word size sufficient to append predecode bits to instructions of the group of instructions.

7. The combination of claim 1, wherein the storage mechanism includes a main memory for storage of the group of instructions and a tag memory for storage of the predecode bits.

8. The combination of claim 1, wherein the storage mechanism includes a main memory, the main memory including a tag table for the predecode bits and a separate section for storage of a plurality of groups of instructions.

9. The combination of claim 1, wherein the storage mechanism includes a main memory, the main memory including a page section having a first section for storage of the group of instructions and a second section for storage of the predecode bits.

10. The combination of claim 1, wherein the group of instructions is a page of instructions.

11. The combination of claim 1, wherein said predecode bits are associated with the group of instructions based upon data dependencies for indicating whether a subsequent instruction needs to use a result obtained by performance of a preceding instruction and also based upon resource dependencies for indicating whether conflicts exist in use of registers.

* * * * *